United States Patent [19]

Rebholz

[11] 4,387,126

[45] Jun. 7, 1983

[54] LAMINATED PACKAGING MATERIAL

[75] Inventor: James H. Rebholz, Burnsville, Minn.

[73] Assignee: Champion International Corporation, Stamford, Conn.

[21] Appl. No.: 347,582

[22] Filed: Feb. 10, 1982

[51] Int. Cl.³ .................... B65D 35/08; B32B 15/08; B32B 3/02

[52] U.S. Cl. .................................... 428/35; 428/192; 428/463; 428/461; 428/516; 428/518; 229/3.5 MF

[58] Field of Search ................. 428/35, 192, 516, 463, 428/518, 461

[56] References Cited

U.S. PATENT DOCUMENTS 3,616,190 10/1971 Shaw .............................. 428/424.8
4,096,309 6/1978 Stillman .............................. 428/457
4,190,477 2/1980 Ossian et al. ..................... 428/35 X
4,311,742 1/1982 Otsuka ............................. 428/461 X

*Primary Examiner*—P. Ives
*Attorney, Agent, or Firm*—Evelyn M. Sommer

[57] ABSTRACT

A laminated packaging material suitable for use in packaging products in pouch form, comprises (A) as an outer surface, a substrate of paper or film which may be printed and/or primed; (B) an adhesive layer, (C) a metallic foil, preferably aluminum, (D) an optional primer, (E) a barrier coextruded layer comprised of two or three-layer combinations of ethylene-methyl acrylate copolymer and polyester, and (F) an optional polyolefin film layer. Pouches prepared from this packaging material provide a chemical barrier between the foil and the product contained therein and are especially useful where the foil needs to be protected from the product.

12 Claims, 2 Drawing Figures

U.S. Patent      Jun. 7, 1983      4,387,126

LAMINATED PACKAGING MATERIAL

BACKGROUND OF THE INVENTION

This invention relates to laminated packaging materials for products which have a detrimental effect on components of the laminate. More particularly, it relates to a laminated material suitable for use in flexible containers for products such as povidone iodine, cosmetics, personal care items, drugs, and the like.

Flexible walled pouches, bags and similar containers have been used with satisfactory results, and to an increasing extent, in the packaging of products such as povidone iodine, personal care items and drugs, where it is essential that the freshness of the product be maintained for a number of months. Generally, such containers are prepared from multi-layered laminated packaging materials whose layers comprise polyolefin resin films and metallic foil. The packaging materials may have from 2 to 8 or more discrete layers, of which one or more layers may consist of adhesive material.

U.S. Pat. No. 3,616,190 discloses a laminated packaging material comprising—in order from the outer surface to the inner surface—cellophane, polyethylene, aluminum foil and heat-sealable polyethylene. The cellophane functions both as an outer surface and as a decorative surface, the decorative design being printed in reverse on the inner side of the cellophane sheet.

U.S. Pat. No. 4,096,309 discloses a laminate comprising a non-woven outer sheet of spun-bonded polymer such as polyethylene, polypropylene or polyester. The next adjacent layer can be a polyolefin film such as polyethylene or polypropylene. The next adjacent layer is a metallic foil and the innermost layer is a heat-sealable polyolefin such as polyethylene or polypropylene. As an outer surface layer, there is preferably provided a face ply of a smooth, nonporous material, such as kraft paper.

U.S. Pat. No. 4,190,477 discloses a laminate of (1) polyester or nylon, (2) metallic foil, (3) extrusion-grade propylene polymer or copolymer and (4) a sealant layer of polypropylene, polyethylene or ethylene vinyl acetate.

In the packaging of certain cosmetic, personal care and drug products, the product itself can have a detrimental effect on the packaging material, particularly on metallic components thereof, such as aluminum foil. Aqueous iodine is an example of a product which will unfavorably react with metal foils. It would therefore be desirable to provide a packaging material in which a chemical barrier layer is provided to protect components of the packaging material from degradation due to chemical reactions with the product contained therein.

SUMMARY OF THE INVENTION

This invention provides a laminated packaging material. The outermost layer is a substrate of paper or polymeric film. Affixed to the substrate is a bonding layer. Affixed to the bonding layer, is a metallic foil, preferably aluminum. The innermost layer, affixed to the metallic foil, is a coextruded laminate of ethylene-methyl acrylate copolymer and polyester. The coextruded innermost layer provides a barrier between the metallic foil and a product contained by the packaging material.

DETAILED DESCRIPTION OF THE INVENTION

Figure 1:
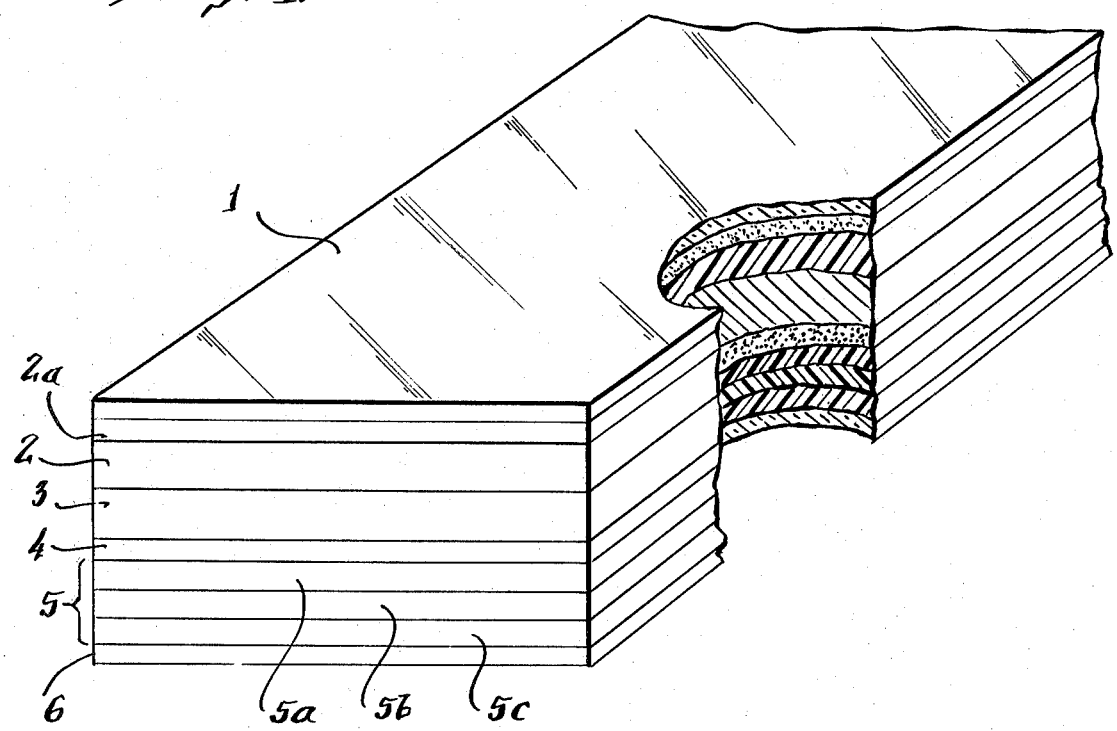
FIG. 1 is a perspective view, partially in section, showing the laminated packaging material of this invention.

Referring to FIG. 1, an outermost layer of the packaging material of this invention is composed of a substrate of paper or polymeric film 1 which may be printed and/or primed. Examples of materials which can be used for the substrate are 25#B Kraft Paper, 50 gauge polyester film, 250K cellophane, 60 gauge nylon film, or 75 gauge polypropylene film. The substrate thickness can range from about 0.3 to 1.5 mils. Substrate 1 is affixed to a layer of metallic foil 3 by a polyolefin adhesive layer 2. The polyolefin layer serves as a bonding agent between the substrate and foil. In addition to the polyolefin adhesive layer 2, an optional priming layer 2a may be used between substrate 1 and adhesive layer 2. Examples of primers which may be used are polyethylene imine or urethane.

The next layer in the laminated packaging material of the present invention is a coextruded barrier laminate 5. An optional primer layer 4 may be disposed between metallic foil 3 and the coextruded barrier laminate 5. Primer 4 may be any conventional adhesive primer well known to those skilled in the art, such as ethylene acrylic acid.

Figure 2:
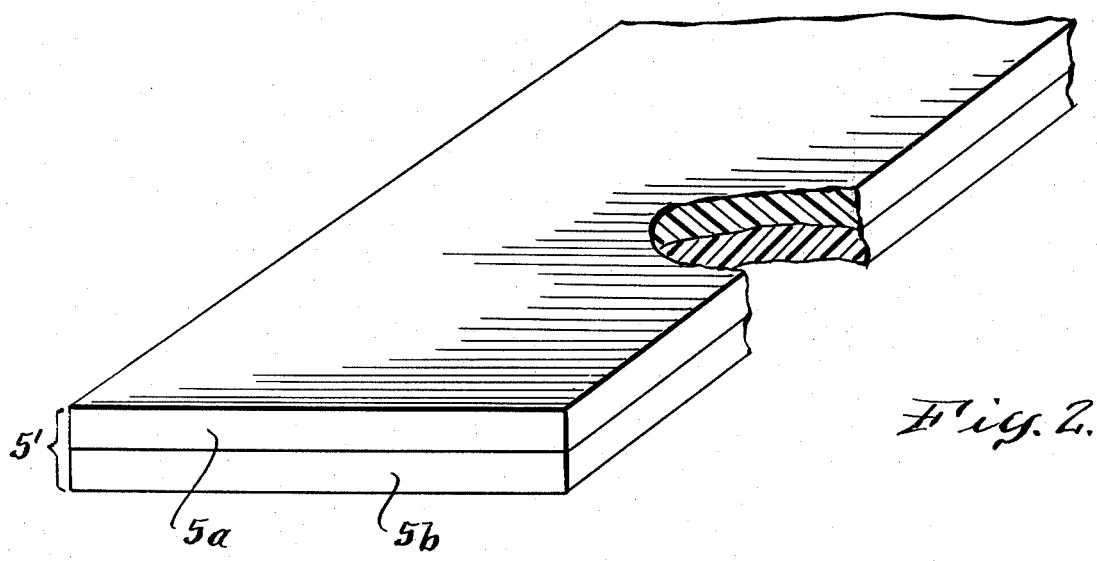
FIG. 2 is a perspective view, partially in section, showing an alternate barrier coextruded layer which can be used in place of that shown in FIG. 1.

Coextruded barrier laminate 5 can be either a two or three layer composite. FIG. 1 shows a three layer composite comprising a first layer of ethylene-methyl acrylate copolymer 5a, a middle layer of polyester 5b, and a third layer of ethylene-methyl acrylate copolymer 5c. In the two layer embodiment, the coextruded barrier composite 5' can comprise ethylene-methyl acrylate copolymer layer 5a and polyester layer 5b without the additional layer 5c, as shown in FIG. 2. The two layer coextruded barrier composite 5' of FIG. 2 may be directly substituted for the three layer composite 5 shown in FIG. 1. Examples of polyesters which can be used for polyester layer 5b are polyethylene terephthalate and a copolyester marketed under the trade name PETG by the Eastman Chemical Company. PETG is an amorphous glycol modified, polyethyelene terephthalate.

The coextruded barrier composite 5 serves to protect metallic foil layer 3 against the corrosive effects of substances contained by the packaging material of the present invention. An example of such a substance is aqueous povidone iodine.

Other examples of corrosive substances which may be packaged in the material of the present invention are cosmetics, personal care items, and drugs. Thus, the packaging material of the present invention is particularly well-suited to applications where the metallic foil in a package needs to the protected from the product contained therein.

The metallic foil layer 3 can be composed of any of the flexible metal foils known in the art, preferably aluminum. The thickness of the foil ranges from about 0.00025 to about 0.00050 inches and is preferably about 0.00035 inches. The metallic foil provides an excellent barrier against penetration of gases and moisture through the laminated material. In addition, it provides protection from ultraviolet light.

An optional, innermost layer of the laminated packaging material is composed of a polyolefin film 6. The use of such a layer provides a means for heat sealing the packaging material into a bag, pouch, or similar type container. The polyolefin film should have a thickness of from about 0.5 to about 3 mils, preferably from 1 to 2 mils. Such thickness insures ready sealbility, contributes substantially to the vapor and water impermeability of the laminate as a whole, and also provides flexibility.

Heat-sealable polyolefins usable in the laminates of the present invention include for example, low density, and medium density polyethylenes. The important consideration in the choice of heat-sealable polyolefin is that it have a softening range which will insure non-melting under the conditions of heat sealing and filling.

Strong adherence between the various layers of these laminates is essential. As already noted, substrate 1 is bonded to metallic foil 3 by a layer 2 composed of a polyolefin adhesive or a primer.

The laminates of this invention may be prepared by any of the means common in the art. The preferred means of such formation will vary in known manner, dependent upon available machinery and the selection of what, if any, optional layers are to be employed. Where convenient, however, these laminates are most easily prepared in sub-combinations and then united.

Once the laminate material is formed, the manufacture of bags, pouches and like containers is also within the ordinary skill in the art. Thus, for example, an essentially rectangular sheet of the present laminate may be folded at its approximate mid-point and any two free sides then joined by the application of heat sufficient to heat-seal their edges. Such technique results in a four-sided envelope construction which may then be filled with the desired contents prior to heat-sealing of the remaining edge. Alternatively, such a container may be manufactured by placing two separate sheets of the laminate face-to-face and heat sealing the adjoining polyolefin film surfaces along the edges thereof. If only three edges are initially heat-sealed, the container can be filled through the opening present at the unsealed edge. The opening may then be heat-sealed, resulting in the final package.

In many of the desired uses for the present packaging materials and containers made therefrom, it is desired to avoid the presence of oxygen within the enclosed container. Because of the high impermeability to gases or liquids provided by the laminates of the present invention, such a storage environment is readily obtained. It is necessary merely to flush the container envelope with inert gas or apply a vacuum through conventional means to void oxygen from the container. Subsequent heat-sealing of the final edge then insures a protective environment for the container contents.

While several embodiments have been described herein for purposes of illustration, it will be appreciated by those skilled in the art that variations and modifications could be made thereto. It is intended to cover all of the variations and modifications which fall within the scope of the present invention, as recited in the appended claims.

What is claimed is:

1. A laminated packaging material adapted to contain substances having a detrimental effect on metallic packaging materials, said laminated packaging material comprising:
   a substrate of paper, cellulosic, or polymeric film as an outer layer;
   a bonding layer affixed to said substrate;
   a metallic foil affixed to said bonding layer; and
   a coextruded inner layer of ethylene-methyl acrylate copolymer and polyester, said co-extruded inner layer adapted to be disposed between said metallic foil and said substances, thus protecting said metallic foil from said substances.

2. The laminated packaging material of claim 1 wherein said coextruded inner layer comprises:
   a first layer of ethylene-methyl acrylate copolymer;
   a second layer of polyester; and
   a third layer of ethylene-methyl acrylate copolymer.

3. The laminated packaging material of claim 1 further comprising a primer between said metallic foil and said coextruded inner layer.

4. The packaging material of claim 3 wherein said primer is an ethylene acrylic acid copolymer.

5. The packaging material of claim 1 wherein said bonding layer comprises a polyolefin.

6. The packaging material of claim 1 further comprising a primer between said substrate and said bonding layer.

7. The packaging material of claim 1 further comprising a layer of polyolefin film affixed to the free innermost surface of said coextruded inner layer.

8. The packaging material of claim 2 further comprising a layer of polyolefin film affixed to the free innermost surface of said coextruded inner layer.

9. The packaging material of claim 1 wherein said metallic foil is aluminum.

10. The packaging material of claim 2 wherein said metallic foil is aluminum.

11. A flexible pouch formed by heat sealing two parallel panels of the laminated packaging material of claim 6 along the edges of their respective inner polyolefin film layers whereby a space is formed between the panels.

12. A flexible pouch formed by heat sealing two parallel panels of the laminated packaging material of claim 7 along the edges of their respective inner polyolefin film layers whereby a space is formed between the panels.

* * * * *